United States Patent
Jung et al.

(10) Patent No.: US 9,391,494 B2
(45) Date of Patent: Jul. 12, 2016

(54) ANTI-SEPARATING STRUCTURE OF SENSING MAGNET FOR MOTOR

(75) Inventors: Soojun Jung, Seoul (KR); Byungyong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 227 days.

(21) Appl. No.: 14/111,789

(22) PCT Filed: Jul. 20, 2011

(86) PCT No.: PCT/KR2011/005318
§ 371 (c)(1),
(2), (4) Date: Oct. 15, 2013

(87) PCT Pub. No.: WO2010/141383
PCT Pub. Date: Oct. 18, 2012

(65) Prior Publication Data
US 2014/0035444 A1 Feb. 6, 2014

(30) Foreign Application Priority Data
Apr. 15, 2011 (KR) .......................... 10-2011-0034961

(51) Int. Cl.
H02K 11/00 (2006.01)
(52) U.S. Cl.
CPC .......... H02K 11/0021 (2013.01); H02K 11/215 (2016.01)
(58) Field of Classification Search
CPC ................... H02K 11/0021; H02K 11/215
USPC ................ 310/68 B, 156.05, 156.06, 156.07
See application file for complete search history.

(56) References Cited

U.S. PATENT DOCUMENTS

| | | | | |
|---|---|---|---|---|
| 4,667,257 A | * | 5/1987 | Chan | 360/99.04 |
| 4,669,008 A | * | 5/1987 | Ichihara | 360/99.12 |
| 4,836,631 A | * | 6/1989 | Shimazu et al. | 359/218.1 |
| 5,783,880 A | * | 7/1998 | Teshima et al. | 310/67 R |
| 6,198,185 B1 | * | 3/2001 | Bruhn et al. | 310/68 B |
| 6,657,328 B2 | * | 12/2003 | Shiga et al. | 310/26 |
| 7,629,724 B2 | * | 12/2009 | Tanno et al. | 310/268 |

(Continued)

FOREIGN PATENT DOCUMENTS

| | | |
|---|---|---|
| CN | 1277485 A | 12/2000 |
| CN | 101108630 A | 1/2008 |

(Continued)

OTHER PUBLICATIONS

Translation of foreign document JP 2005094821 A (Year: 2005).*

(Continued)

*Primary Examiner* — Alex W Mok
(74) *Attorney, Agent, or Firm* — Saliwanchik, Lloyd & Eisenschenk

(57) ABSTRACT

The present invention relates to an anti-separating structure of sensing magnet for motor, wherein, the coupling between the plate and the sensing magnet is effected by the bent unit formed at the plate and a separate cap member to reinforce the coupling power to axial, horizontal and rotational directions by the mechanical structure, and to improve a structural stability and operational reliability, the structure including a plate formed with a plate insertion hole that vertically penetrates the plate; a sensing magnet formed with a magnet insertion hole corresponding to the plate insertion hole; and a plate-shaped cap member including a coupling lug coupled by penetrating the plate insertion hole and the magnet insertion hole.

7 Claims, 2 Drawing Sheets

(56) References Cited

U.S. PATENT DOCUMENTS

| | | | |
|---|---|---|---|
| 8,791,610 B2 * | 7/2014 | Kim et al. | 310/68 B |
| 2002/0060105 A1 | 5/2002 | Tominaga et al. | |
| 2008/0012452 A1 | 1/2008 | Tsukamoto et al. | |
| 2008/0048532 A1 * | 2/2008 | Hsieh et al. | 310/68 B |
| 2009/0079286 A1 * | 3/2009 | Kim et al. | 310/156.43 |
| 2009/0315493 A1 | 12/2009 | Hsu | |
| 2010/0196174 A1 | 8/2010 | Lee | |

FOREIGN PATENT DOCUMENTS

| | | | |
|---|---|---|---|
| CN | 101557140 A | 10/2009 | |
| EP | 0210835 A2 | 2/1987 | |
| EP | 1968169 A2 | 9/2008 | |
| JP | 2005094821 A | 4/2005 | |
| JP | 2008-206354 A | 9/2008 | |
| JP | 2008219996 A | 9/2008 | |
| KR | 10-2000-0055855 A | 9/2000 | |
| KR | 10-2006-0118669 A | 11/2006 | |
| KR | 10-2009-0029439 A | 3/2009 | |
| WO | WO 2009075076 A1 * | 6/2009 | |

OTHER PUBLICATIONS

International Search Report in International Application No. PCT/KR2011/005318, filed Jul. 20, 2011.

Office Action dated May 6, 2015 in Chinese Application No. 2011800701472.

Office Action dated Jul. 28, 2015 in Japanese Application No. 2014-505052.

Extended European Search Report dated Feb. 10, 2016 in European Application No. 11863371.8.

* cited by examiner

ANTI-SEPARATING STRUCTURE OF SENSING MAGNET FOR MOTOR

CROSS-REFERENCE TO RELATED APPLICATIONS

This application is the U.S. national stage application of International Patent Application No. PCT/KR2011/005318, filed Jul. 20, 2011, which claims priority to Korean Application No. 10-2011-0034961, filed Apr. 15, 2011, the disclosures of each of which are incorporated herein by reference in their entirety.

TECHNICAL FIELD

The teachings in accordance with the exemplary embodiments of this invention relate generally to an anti-separating structure of sensing magnet for motor, and more particularly to an anti-separating structure of sensing magnet for motor capable of applying a mechanical coupling force to a sensing magnet and a plate to stably prevent the sensing magnet from moving to axial, horizontal and rotational directions.

BACKGROUND ART

Generally, a steering system is used that assists in separate power, as a system for assuring a steering safety of a vehicle. A conventional auxiliary steering system used to employ hydraulic pressure, but recently an electronic power steering system (EPS) excellent in accuracy and having less power loss is used.

The EPS is adapted to transmit a rotation output of an electric motor to a steering shaft via a speed reduction mechanism. In other words, the EPS is operated in such a manner that a motor is driven by an electronic control unit based on travel conditions detected by a vehicle speed sensor, a torque angle sensor and a torque sensor to thereby insure a rotational stability and to provide a quick restoring force, whereby a driver can drive a vehicle safely.

The EPS is such that a torque manipulating a steering wheel for steering by a driver is assisted by a motor to allow a steering operation with less power, where a BLDC (Brushless Direct Current) motor is usually used for the motor. The BLDC motor is a DC motor mounted with an electronic rectifying mechanism except for mechanical contact areas such as a brush and a rectifier.

FIG. 1 is a lateral cross-sectional view illustrating a motor according to prior art.

Referring to FIG. 1, the conventional motor includes a substantially cylindrical upper-opened housing (1) and a bracket (2) coupled to the upper surface of the housing (1).

The housing (1) and the bracket (2) are respectively supported by a rotation shaft (3). The rotation shaft (3) is connected thereon with a steering shaft of a vehicle to provide an assisting power to steering as mentioned above. A periphery of the rotation shaft (3) is formed with a rotor (5) comprised of a core and a magnet, and the housing (1) is coupled at an inner surface thereof with a stator (4) formed with a core and a coil to provide an electromagnetic force to the periphery of the rotor (5).

In a case a current is applied to the stator, the rotor (5) is rotated by an electrical mutual action between the rotor and the stator, whereby the rotation shaft (3) is rotated to assist the rotation of a steering shaft.

The bracket (2) is mounted thereon with a PCB (8, Printed Circuit Board) formed with a sensor (9), and a plate (6) is coupled thereto to rotate with the rotation shaft (3) discrete at a predetermined space on an upper side of the PCB. The plate (6) is arranged thereunder with a sensing magnet (7). The sensing magnet (7) is rotated along with the rotation of the rotation shaft (3) to calculate a rotation angle based on changes in magnetic flux based on rotation detected by the sensor (9).

Thus, the steering torque can be assisted by rotating the rotation shaft through application by the motor of an appropriate current to the stator based on the rotation angle.

Meantime, the coupling between the plate (6) and the sensing magnet (7) is made by an adhesive, such that there may arise a problem in adhesion process between the plate (6) and the sensing magnet (7) to create a possibility of disengaging the magnet. Particularly, the adhesion problem may worsen where the coupled relation has to be maintained by a coupling power of the adhesion alone in light of variably changing environmental condition of a vehicle.

The conventional structure may pose problems involving economic matters of selecting and using a high-priced adhesive and requiring a more accurate adhering process than that of an adhesive coating process.

DISCLOSURE OF INVENTION

Technical Problem

The present invention is directed to solve the aforementioned problems, disadvantages or shortcomings, and is to provide an anti-separating structure of sensing magnet for motor configured to stably prevent the sensing magnet from moving to axial, horizontal and rotational directions by having a structure capable of applying a mechanical coupling force to a sensing magnet and a plate.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided an anti-separating structure of sensing magnet for motor, the structure characterized by: a plate formed with a plate insertion hole; a sensing magnet formed with a magnet insertion hole corresponding to the plate insertion hole; and a plate-shaped cap member including a coupling lug coupled by penetrating the plate insertion hole and the magnet insertion hole. Thus, a coupling power between the sensing magnet and the plate can be reinforced to improve an operation reliability of the motor.

Preferably, the plate insertion hole, the magnet insertion hole and the coupling lug are symmetrically arranged about an opening through which a rotation shaft passes. Thus, the sensing magnet can be prevented from moving to horizontal and rotational directions.

Preferably, the cap member is coupled to a bottom surface of the sensing magnet, and the sensing magnet includes a groove-shaped accommodation unit on which an upper surface of the cap member is accommodated. Thus, a separate member of cap member is not protruded downward to be free from spatial loss.

Preferably, the coupling lug includes a staircase sill protruded from a bottom end to an outside, and the staircase sill is hitched at an upper surface of the plate to axially couple the plate and the sensing magnet. Thus, an excellent mechanical coupling power can be provided.

Preferably, the anti-separating structure of sensing magnet for motor further characterized by: a bent unit so formed as to protrude to a bottom surface of the plate; and a groove-shaped fixing hole formed at an area corresponding to the bent unit of the sensing magnet, where the bent unit is inserted into the fixing hole to reinforce a coupling power to horizontal and rotational directions of the sensing magnet and the plate. Thus, a coupling power can be further reinforced to the horizontal direction of the sensing magnet through the bent unit.

Preferably, width of the bent unit corresponds to that of the fixing hole. Thus, support to horizontal and rotational directions can be made to be further precise.

Preferably, a height of the bent unit when completely bent corresponds to an axial depth of the fixing hole. Thus, the possibility of interference by the bent unit can be removed.

Preferably, the sensing magnet includes a main magnet circumferentially arranged by being adjacent to an opening into which the rotation shaft is inserted, and a sub magnet circumferentially arranged at a periphery of the main magnet, where the number of poles at the sub magnet is greater than that of the main magnet. Thus, a rotational detection capability of the sensing magnet can be made excellent.

Advantageous Effects of Invention

The anti-separating structure of sensing magnet for motor thus configured has advantageous effects in that the coupling between the plate and the sensing magnet is effected by the bent unit formed at the plate and a separate cap member to reinforce the coupling power to axial, horizontal and rotational directions by the mechanical structure, and to improve a structural stability and operational reliability.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, exemplary embodiment of the present invention will be described in detail with reference to the accompanying drawings.

Figure 2:
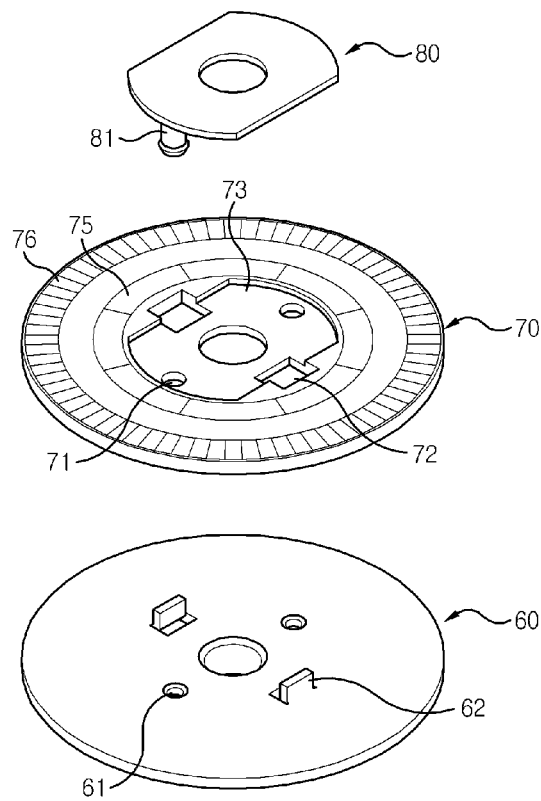
FIG. 2 is an exploded perspective view of a plate and a sensing magnet of a motor according to an exemplary embodiment of the present invention.
Figure 3:
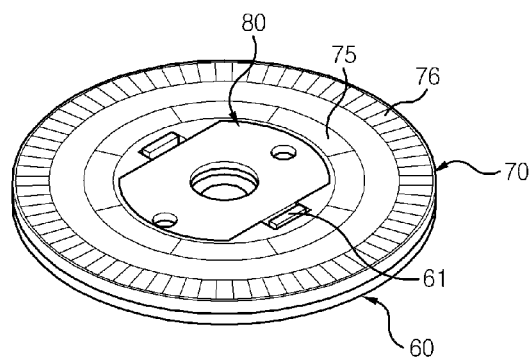
FIG. 3 is a perspective view seen from under of a state where a plate and a sensing magnet of a motor are coupled according to the present invention.
Figure 4:
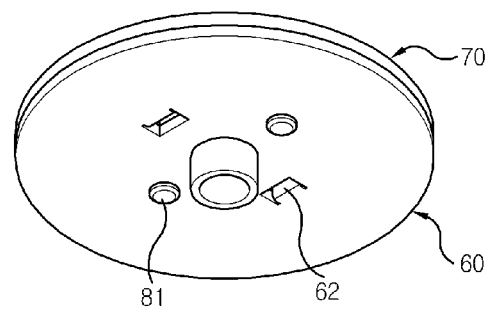
FIG. 4 is a perspective view of a state where a plate and a sensing magnet of a motor are coupled according to the present invention.

FIG. 2 is an exploded perspective view of a plate and a sensing magnet of a motor according to an exemplary embodiment of the present invention, FIG. 3 is a perspective view seen from under of a state where a plate and a sensing magnet of a motor are coupled according to the present invention, and FIG. 4 is a perspective view of a state where a plate and a sensing magnet of a motor are coupled according to the present invention.

Figure 1:
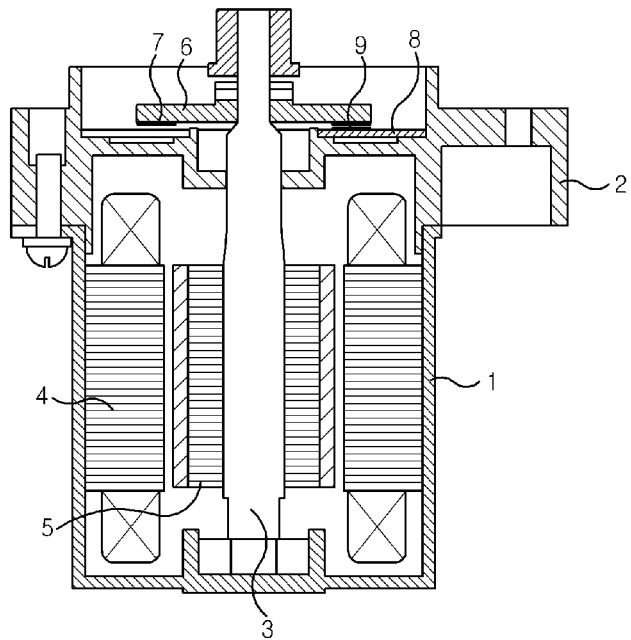
FIG. 1 is a lateral cross-sectional view illustrating a motor according to prior art.

Referring to FIG. 1, a plate is arranged at upper side of a motor and a sensing magnet is coupled to a bottom surface, and based on the arrangement, a direction where a sensing magnet (70) of a plate (60) is coupled is defined as a bottom direction or a bottom side, and a direction opposite thereto is defined as an upper direction or an upper side.

The plate (60) takes the shape of a disk, and is centrally formed with a vertical opening (61) through which a rotation shaft can be fixedly inserted. According to the concept of the present invention, a bent unit (62) is formed across the plated opening (61), which is a structure to reinforce a coupling power with the sensing magnet (70) as will be described later.

The bent unit (62) is formed by cutting the plate in the form of a protruding '⊏' shape and bending the cut portion. The bending work is preferably performed by a pressing after the sensing magnet (70) is coupled.

Meanwhile, although two bent units (62) are exemplified and illustrated in the drawing, it should be apparent that only one bent unit may be arranged case by case, and more than three bent units may be arranged to reinforce the coupling power. Furthermore, although the bent unit (62) may be formed by cutting the plate in the protruding '⊏' shape and bending the cut portion after the sensing magnet (70) is coupled as in the exemplary embodiment of the present invention, the bent unit may be replaced by a protruding lug formed on a surface of the plate (60) at the time of manufacturing the plate (60).

The sensing magnet (70) takes the shape of a disk corresponding to that of the plate (60), and is centrally formed with a magnet opening through which a rotation shaft can pass, as in the case of the plate (60). The sensing magnet (70) includes a main magnet (75) circumferentially arranged at a bottom by being adjacent to the central opening, and a sub magnet (76) formed at a periphery of the main magnet (75).

The main magnet (75) is arranged in the same as a magnet of a rotor of the motor to measure rotation of the rotor through a Hall sensor (Hall Integrated Circuit). The sub magnet (76) is formed with more poles in addition to the main magnet (75), whereby a pole of the main magnet (75) can be further segmentalized. To be more specific, the sub magnet (76) further segmentalizes one pole of the main magnet (75) to measure the rotation of rotor at the motor, whereby detection of revolution can be more precisely measured to smooth the driving of the motor.

Both sides of the magnet opening (71) are formed with fixing holes (72) corresponding to the bent unit (62). The fixing hole (72) corresponds to the bent unit (62) in terms of position, the number and width. Therefore, it is preferable that an outer width of the bent unit (62) correspond to an inner width of the fixing unit (72). Under this circumstance, if there is any external force being applied, the bent unit (62) and the fixing hole (72) serve as stopper to prevent the sensing magnet (70) from rotating relative to the plate (60).

In the course of an upper surface of the sensing magnet (70) being coupled to the plate (60), the positions of the bent unit (62) and the fixing hole (72) are matched to allow the sensing magnet (70) to be arranged on the plate (60). Thereafter, the bent unit (62) is pressed and contacted to the fixing hole (72) downward of the sensing magnet (70), whereby the sensing magnet (70) is prevented from being disengaged downward through friction force between the bent unit (62) and the fixing hole (72). At this time, a bottom surface of the plate (60) and the upper surface of the sensing magnet (70) may be coated with an adhesive prior to bending work.

In a case the bent unit (62) is pressed to be completely bent, the depth of the fixing hole (72) and the height of the bent unit that is completely bent are substantially corresponded lest a distal end should be protruded further to the downward direction of the sensing magnet (70).

In a case an inner surface of the fixing hole (72) is perpendicularly faced and the bent unit (62) is also perpendicularly faced, an axial support is limited due to friction force, such that an inner surface of the fixing hole (72) contacting the bent unit (62) may be circumferentially inclined to the downstream side. In a case the bent unit (62) is pressed to be completely bent, the bent unit (72) is preferably bent at 90° relative to an inclination surface of the fixing hole (72), whereby an axial coupling power can be advantageously reinforced.

However, in a case a separate cap member (80) is arranged to reinforce the coupling power, the bent unit (62) is pre-bent in the forming process of plate (60), and the bent unit (62) is inserted into the fixing hole (72) in the course of being coupled, and the bent unit (62) may only serve to fix the horizontal and rotational directions of the sensing magnet (70).

Furthermore, in a case the bent unit is formed by protruding a surface of the plate (60), it should be apparent that the sensing magnet (70) is coupled by way of press-fitting method through the fixing hole.

Meanwhile, a cap member (80) of a separate coupling member is further included to reinforce the coupling power between the sensing magnet (70) and the plate (60).

The cap member (80) takes the shape of a plate and is formed with a coupling lug (81) for coupling through the plate (60) and the sensing magnet (70). Preferably, the cap member (80) reinforces a coupling power between the plate (60) and the sensing magnet (70) by allowing a coupling lug (81) coupled from a bottom surface of the sensing magnet (70) and protruded upward to insertedly pass the magnet insertion hole (71) formed by vertically penetrating the sensing magnet (70) and the plate insertion hole (61) formed at the plate (60).

The cap member (80) may be coupled to a center of the sensing magnet (70), and in this case, an opening corresponding the opening of the plate (60) and the sensing magnet (70) is centrally formed to allow the rotation shaft to pass therethough.

Preferably, two or more coupling lugs (81) are symmetrically arranged about the opening. FIG. 2 illustrates and exemplifies two coupling lugs (81) about the opening. However, only one coupling lug (81) may suffice as long as a coupling power to axial, horizontal and rotational directions of the plate (60) and the sensing magnet (70) can be guaranteed along with the arrangement of the bent unit (62).

The cap member (80) may be integrally formed with the coupling lug (81) through injection molding. The cap member (80) is coupled to a bottom surface of the sensing magnet (70), and the sensing magnet (70) may more preferably include a groove-shaped accommodation unit (73) on which an upper surface of the cap member (80) is accommodated to avoid a spatial loss that is generated by the cap member (80) that is protruded downwards because the sensing magnet (70) is accommodated in a limited space of the motor. At this time, the shape and depth of the accommodation unit (73) correspond to the plate shape and thickness of the cap member (80).

Mode for the Invention

Referring to FIGS. 2, 3 and 4, a coupling process of the plate (60), the sensing magnet (70) and the cap member (80) will be described.

In a case the cut/bent plate (60) is provided adjacent to the plate opening (61) on the plate (60), the sensing magnet (70) is placed to correspond to a position of the fixing hole (72) thereunder.

In a case the bent unit (62) is inserted into the fixing hole (72) to allow the plate (60) to be brought into contact with the sensing magnet (70), the cap member (80) is coupled to upward from down under, where the coupling lug (81) of the cap member (80) is coupled by passing through the plate insertion hole (61) and the magnet insertion hole (71).

FIG. 3 is a perspective view seen from under of a state where a plate and a sensing magnet of a motor are coupled according to the present invention, where, the cap member (80) provides a spatial advantage because the cap member (80) is not protruded downwards, and is coupled in the manner of being inserted into the accommodation unit (73) of the sensing magnet (70).

Meanwhile, FIG. 4 is a perspective view of a state where a plate and a sensing magnet of a motor are coupled according to the present invention, where a bottom end of the coupling lug (81) forms a predetermined area to be secured to an upper surface of the plate (60).

Referring to FIG. 2 again, the coupling lug (81) takes the shape of a round pillar having a radius corresponding to an inner shape of the plate insertion hole (61) and the magnet insertion hole (71), where a radius of the bottom end may form a staircase sill having a larger area.

The coupling lug (81) is formed of an elastic material, and once the insertion of the coupling lug (81) is completed, the staircase sill of the bottom end at the coupling lug (81) is coupled to the upper surface of the plate (60), whereby an axial coupling power of the plate (60) and the sensing magnet (70) can be reinforced.

It should be apparent that the coupling lug (81) is entirely formed in the shape of a wedge, and a distal end takes the shape of a hook.

The anti-separating structure of sensing magnet for motor thus configured according to the concept of the present invention has an advantageous effect in that a bent unit formed at a plate is inserted into a fixing hole of a sensing magnet to prevent the sensing magnet from moving to horizontal and rotational directions, a coupling lug of a cap member further reinforce a coupling force to horizontal and rotational directions to prevent disengagement to an axial direction.

The anti-separating structure of sensing magnet for motor thus configured according to the concept of the present invention has another advantageous effect in that a coupling force between the plate and the sensing magnet is increased to further enhance the operational reliability of the motor.

INDUSTRIAL APPLICABILITY

The present invention has an industrial applicability in that the coupling between the plate and the sensing magnet is realized by the bent unit formed at the plate and a separate cap member to reinforce the coupling power to axial, horizontal and rotational directions by the mechanical structure, and to improve a structural stability and operational reliability, such that the present invention can be applied to an electronic power steering system that ensures a steering stability of a vehicle.

The invention claimed is:

1. An anti-separating structure of sensing magnet for motor, the structure comprising: a plate formed with a plate insertion hole; a sensing magnet formed with a magnet insertion hole corresponding to the plate insertion hole;
   a plate-shaped cap member including a coupling lug coupled by penetrating the plate insertion hole and the magnet insertion hole;
   a bent unit so formed as to protrude to a bottom surface of the plate; and
   a groove-shaped fixing hole formed at an area corresponding to the bent unit of the sensing magnet,
   wherein the bent unit is disposed into the fixing hole to reinforce a coupling power to horizontal and rotational directions of the sensing magnet and the plate.

2. The structure of claim 1, wherein the plate insertion hole, the magnet insertion hole and the coupling lug are symmetrically arranged about an opening through which a rotation shaft passes.

3. The structure of claim 1, wherein the cap member is coupled to a bottom surface of the sensing magnet, and the sensing magnet includes a groove-shaped accommodation unit on which an upper surface of the cap member is accommodated.

4. The structure of claim 1, wherein the coupling lug includes a staircase sill protruded from a bottom end to an outside, and the staircase sill is hitched at an upper surface of the plate to axially couple the plate and the sensing magnet.

5. The structure of claim 1, wherein a width of the bent unit corresponds to that of the fixing hole.

6. The structure of claim 1, wherein a height of the bent unit when completely bent corresponds to an axial depth of the fixing hole.

7. The structure of claim 1, wherein the sensing magnet includes a main magnet circumferentially arranged by being adjacent to an opening into which a rotation shaft is inserted, and a sub magnet circumferentially arranged at a periphery of the main magnet, where the number of poles at the sub magnet is greater than that of the main magnet.

* * * * *